(12) United States Patent
Itano et al.

(10) Patent No.: US 12,540,264 B2
(45) Date of Patent: Feb. 3, 2026

(54) COMPOSITION CONTAINING REFRIGERANT, USE OF SAME, REFRIGERATOR COMPRISING SAME, AND METHOD FOR OPERATING SAID REFRIGERATOR

(71) Applicant: DAIKIN INDUSTRIES, LTD., Osaka (JP)

(72) Inventors: Mitsushi Itano, Osaka (JP); Shun Ohkubo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 174 days.

(21) Appl. No.: 18/243,359

(22) Filed: Sep. 7, 2023

(65) Prior Publication Data

US 2023/0416581 A1 Dec. 28, 2023

Related U.S. Application Data

(63) Continuation of application No. PCT/JP2022/010086, filed on Mar. 8, 2022.

(30) Foreign Application Priority Data

Mar. 9, 2021 (JP) .................................. 2021-037768

(51) Int. Cl.
*C09K 5/04* (2006.01)
(52) U.S. Cl.
CPC .......... *C09K 5/045* (2013.01); *C09K 2205/22* (2013.01); *C09K 2205/40* (2013.01); *F25B 2400/121* (2013.01)

(58) Field of Classification Search
CPC .......................... C09K 5/045; C09K 2205/22; C09K 2205/40; C09K 2205/126; F25B 2400/121

See application file for complete search history.

(56) References Cited

U.S. PATENT DOCUMENTS

| | | |
|---|---|---|
| 2016/0333243 A1 | 11/2016 | Fukushima et al. |
| 2017/0002245 A1 | 1/2017 | Fukushima |
| 2020/0377777 A1 | 12/2020 | Ohkubo et al. |
| 2020/0386459 A1* | 12/2020 | Itano ..................... H02K 17/16 |
| 2022/0098460 A1 | 3/2022 | Itano et al. |

(Continued)

FOREIGN PATENT DOCUMENTS

| | | | |
|---|---|---|---|
| JP | 2020019948 A * | 2/2020 | ............. C09K 21/08 |
| WO | 2015/115252 | 8/2015 | |
| WO | 2015/141678 | 9/2015 | |

(Continued)

OTHER PUBLICATIONS

Extended European Search Report issued Jul. 25, 2024 in corresponding European Patent Application No. 22767159.1.

(Continued)

*Primary Examiner* — Emmanuel E Duke
(74) *Attorney, Agent, or Firm* — Wenderoth, Lind & Ponack, L.L.P.

(57) ABSTRACT

An object is to provide a novel low-GWP mixed refrigerant. Provided as a means for a solution is a composition comprising a refrigerant, the refrigerant comprising trans-1,2-difluoroethylene (HFO-1132(E)), 1,3,3,3-tetrafluoropropene (R1234ze), and 2,3,3,3-tetrafluoro-1-propene (R1234yf).

13 Claims, 2 Drawing Sheets

(56) References Cited

U.S. PATENT DOCUMENTS

2022/0106512 A1 4/2022 Itano et al.
2023/0151257 A1 5/2023 Itano et al.

FOREIGN PATENT DOCUMENTS

| WO | WO-2020017604 A1 * | 1/2020 | ............ C09K 21/08 |
|----|----|----|----|
| WO | 2020/158257 | 8/2020 | |
| WO | 2020/256112 | 12/2020 | |
| WO | 2020/256117 | 12/2020 | |
| WO | 2022/025287 | 2/2022 | |

OTHER PUBLICATIONS

International Search Report issued May 17, 2022 in corresponding International (PCT) Patent Application No. PCT/JP2022/010086.
International Preliminary Report on Patentability issued Sep. 12, 2023 in corresponding International (PCT) Patent Application No. PCT/JP2022/010086.
Mark O. McLinden et al., "Limited options for low-global-warming-potential refrigerants", Nature Communications, vol. 8, 14476, 2016.
Mark O. McLinden et al., "A thermodynamic analysis of refrigerants: Possibilities and tradeoffs for Low-GWP refrigerants", International Journal of Refrigeration, vol. 38, pp. 80-92, 2014.

* cited by examiner

COMPOSITION CONTAINING REFRIGERANT, USE OF SAME, REFRIGERATOR COMPRISING SAME, AND METHOD FOR OPERATING SAID REFRIGERATOR

TECHNICAL FIELD

The present disclosure relates to a composition comprising a refrigerant, use of the composition, a refrigerating machine having the composition, and a method for operating the refrigerating machine.

BACKGROUND ART

As a working medium for a heat cycle that can replace R410A, a working medium for a heat cycle comprising trifluoroethylene (HFO-1123) and 1,2-difluoroethylene (HFO-1132) has been proposed (Patent Literature (PTL) 1).

CITATION LIST

Patent Literature

PTL 1: WO2015/141678

SUMMARY

A composition comprising a refrigerant, the refrigerant comprising trans-1,2-difluoroethylene (HFO-1132(E)), 1,3,3,3-tetrafluoropropene (R1234ze), and 2,3,3,3-tetrafluoro-1-propene (R1234yf).

Advantageous Effects

The refrigerant according to the present disclosure has a low GWP.

DESCRIPTION OF EMBODIMENTS

Figure 1:
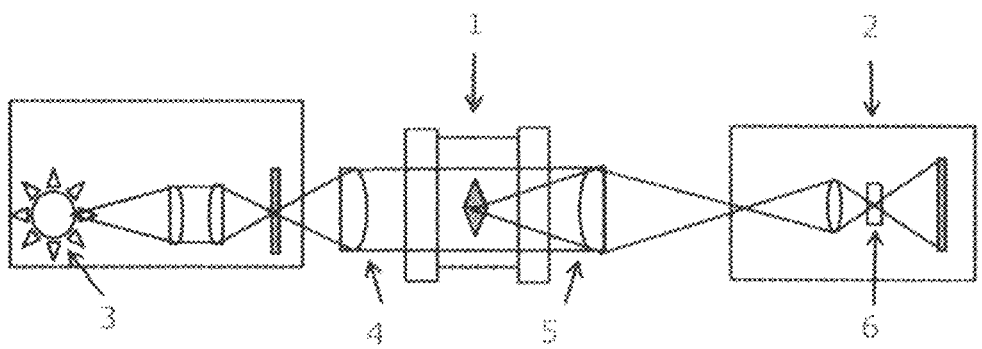
FIG. 1 is a schematic view of an apparatus used in a flammability test.
Figure 2:
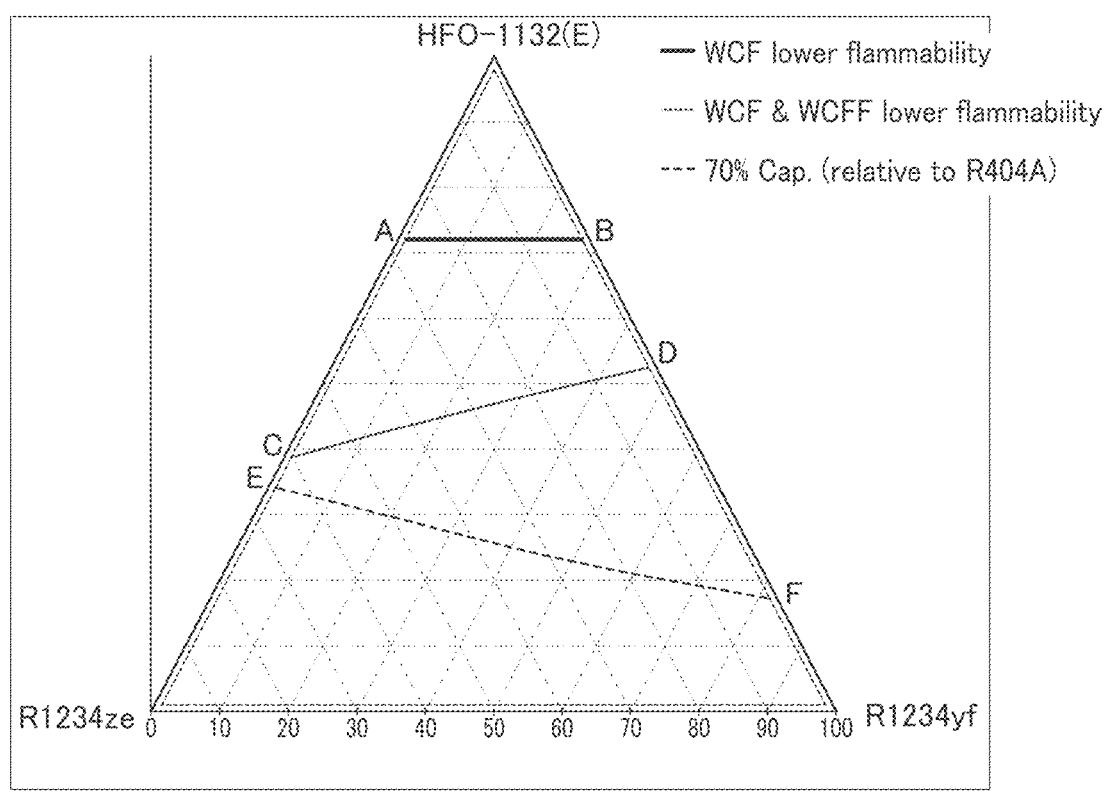
FIG. 2 is a ternary composition diagram in which the sum of HFO-1132(E), R1234ze, and R1234yf is 100 mass %, and that shows points A to F.
Figure 3:
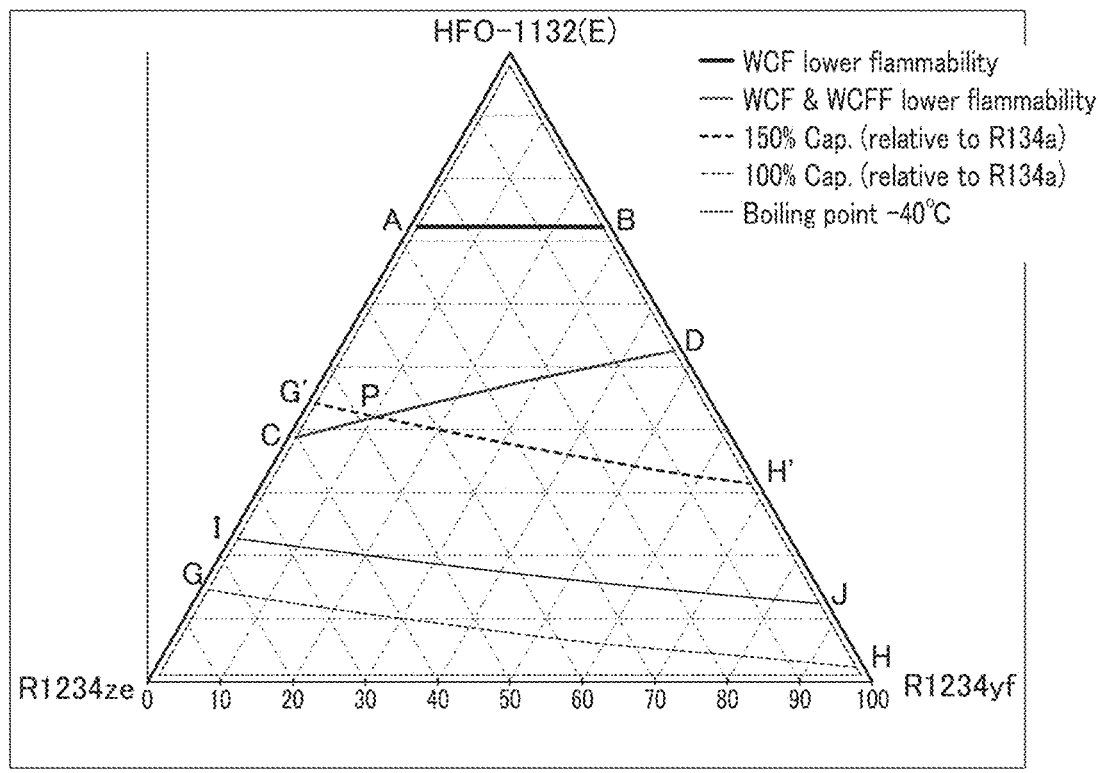
FIG. 3 is a ternary composition diagram in which the sum of HFO-1132(E), R1234ze, and R1234yf is 100 mass %, and that shows points G to J, G', and H', in addition to points A to D.

As a result of intensive studies to achieve the above object, the present inventors found that a mixed refrigerant comprising HFO-1132(E), R1234ze, and R1234yf has the above properties.

The present disclosure has been completed as a result of further research based on this finding. The present disclosure includes the following embodiments.

DEFINITION OF TERMS

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC).

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

The unit for the pressure described in the present specification is absolute pressure, unless otherwise specified.

In the present specification, "a refrigerant having WCF lower flammability" means that the most flammable formulation (worst case of formulation for flammability: WCF) in accordance with U.S. ANSI/ASHRAE Standard 34-2013 has a burning velocity of 10 cm/s or less.

Further, in the present specification, "a refrigerant having ASHRAE lower flammability (WCF & WCFF lower flammability)" means that the burning velocity of WCF is 10 cm/s or less, that the most flammable fraction formulation (worst case of fractionation for flammability: WCFF), which is specified by performing a leakage test during storage, transportation, or use based on ANSI/ASHRAE 34-2013 using WCF, has a burning velocity of 10 cm/s or less, and that the flammability classification according to the US ANSI/ASHRAE Standard 34-2013 is determined to be classified as "Class 2L."

1. Refrigerant

The refrigerant according to the present disclosure comprises HFO-1132(E), R1234ze, and R1234yf.

The refrigerant according to the present disclosure is a low-GWP mixed refrigerant.

The refrigerant according to the present disclosure preferably satisfies the following requirements. In this case, the refrigerant according to the present disclosure ensures a WCF lower flammability and has a refrigerating capacity ratio of 70% or more relative to that of R404A.

Requirements

In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BF, FE, and EA that connect the following four points:
point A (72.0, 27.0, 1.0),
point B (72.0, 1.0, 27.0),
point F (17.0, 1.0, 82.0), and
point E (34.1, 64.9, 1.0),
or on the line segments,
line segments AB, BF, and EA are straight lines, and
points on line segment FE are represented by (x, $-0.0556x^2+6.5772x-94.748$, $0.0556x^2-7.5772x+194.748$).

The refrigerant according to the present disclosure preferably satisfies the following requirements. In this case, the refrigerant according to the present disclosure ensures an ASHRAE lower flammability (WCF & WCFF lower flammability) and has a refrigerating capacity ratio of 70% or more relative to that of R404A.

Requirements

In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments CD, DF, FE, and EC that connect the following four points:
point C (38.7, 60.3, 1.0),
point D (52.4, 1.0, 46.6),
point F (17.0, 1.0, 82.0), and
point E (34.1, 64.9, 1.0),
or on the line segments,
line segments DF and EC are straight lines,
points on line segment CD are represented by (x, $-0.0455x^2-0.1834x+135.54$, $0.0455x^2-0.8166x-35.54$), and
points on line segment FE are represented by (x, $-0.0556x^2+6.5772x-94.748$, $0.0556x^2-7.5772x+194.748$).

The refrigerant according to the present disclosure preferably satisfies the following requirements. In this case, the refrigerant according to the present disclosure ensures a WCF lower flammability and has a refrigerating capacity ratio of 100% or more relative to that of R134a.

Requirements

In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BH, HG, and GA that connect the following four points:
point A (72.0, 27.0, 1.0),
point B (72.0, 1.0, 27.0),
point H (2.1, 1.0, 96.9), and
point G (14.4, 84.6, 1.0),
or on the line segments,
line segments AB, BH, and GA are straight lines, and
points on line segment HG are represented by (x, $-0.1974x^2+10.054x-19.242$, $0.1974x^2-11.054x+119.242$).

The refrigerant according to the present disclosure preferably satisfies the following requirements. In this case, the refrigerant according to the present disclosure ensures a WCF lower flammability and has a boiling point of $-40°$ C. or less.

Requirements

In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BJ, JI, and IA that connect the following four points:
point A (72.0, 27.0, 1.0),
point B (72.0, 1.0, 27.0),
point J (12.3, 1.0, 86.7), and
point I (22.6, 76.4, 1.0),
or on the line segments,
line segments AB, BJ, and IA are straight lines, and
points on line segment JI are represented by (x, $-0.1609x^2+12.934x-133.76$, $0.1609x^2-13.934x+233.76$).

The refrigerant according to the present disclosure preferably satisfies the following requirements. In this case, the refrigerant according to the present disclosure ensures an ASHRAE lower flammability (WCF & WCFF lower flammability) and has a refrigerating capacity ratio of 150% s or more relative to that of R134a.

Requirements

In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BH', H'G', and G'A that connect the following four points:
point A (72.0, 27.0, 1.0),
point B (72.0, 1.0, 27.0),
point H' (31.3, 1.0, 67.7), and
point G' (44.1, 54.9, 1.0),
or on the line segments,
line segments AB, BH', and G'A are straight lines, and
points on line segment H'G' are represented by (x, $-0.08728x2+10.791x-251.26$, $0.08728x^2-11.791x+351.26$).

The refrigerant according to the present disclosure preferably satisfies the following requirements. In this case, the refrigerant according to the present disclosure ensures an ASHRAE lower flammability (WCF & WCFF lower flammability) and has a refrigerating capacity ratio of 100% or more relative to that of R134a.

Requirements

In the refrigerant, when the mass %, of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 masse are within the range of a figure surrounded by line segments CD, DH, HG, and GC that connect the following four points:
  point C (38.7, 60.3, 1.0),
  point D (52.4, 1.0, 46.6),
  point H (2.1, 1.0, 96.9), and
  point G (14.4, 84.6, 1.0),
  or on the line segments,
    line segments DH and GC are straight lines,
    points on line segment CD are represented by (x, $-0.0455x^2-0.1834x+135.54$, $0.0455x^2-0.8166x-35.54$), and
    points on line segment HG are represented by (x, $-0.1974x^2+10.054x-19.242$, $0.1974x^2-11.054x+119.242$).

The refrigerant according to the present disclosure preferably satisfies the following requirements. In this case, the refrigerant according to the present disclosure ensures an ASHRAE lower flammability (WCF & WCFF lower flammability) and has a boiling point of −40° C. or less.

Requirements

In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 masse are within the range of a figure surrounded by line segments CD, DJ, JI, and IC that connect the following four points:
  point C (38.7, 60.3, 1.0),
  point D (52.4, 1.0, 46.6),
  point J (12.3, 1.0, 86.7), and
  point I (22.6, 76.4, 1.0),
  or on the line segments,
    line segments DJ and IC are straight lines,
    points on line segment CD are represented by (x, $-0.0455x^2-0.1834x+135.54$, $0.0455x^2-0.8166x-35.54$), and
    points on line segment JI are represented by (x, $-0.1609x^2+12.934x-133.76$, $0.1609x^2-13.934x+233.76$).

The refrigerant according to the present disclosure preferably satisfies the following requirements. In this case, the refrigerant according to the present disclosure ensures an ASHRAE lower flammability (WCF & WCFF lower flammability) and has a refrigerating capacity ratio of 150% or more relative to that of R134a.

Requirements

In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments PD, DH', and H'P that connect the following three points:
  point P (41.95, 47.8, 10.25),
  point D (52.4, 1.0, 46.6), and
  point H' (31.3, 1.0, 67.7),
  or on the straight lines,
    line segment DH' is a straight line,
    points on line segment PD are represented by (x, $-0.0455x^2-0.1834x+135.54$, $0.0455x^2-0.8166x-35.54$), and
    points on line segment H'P are represented by (x, $-0.08728x^2+10.791x-251.26$, $0.08728x^2-11.791x+351.26$).

The refrigerant according to the present disclosure may further comprise additional refrigerants, in addition to HFO-1132(E), R1234ze, and R1234yf, as long as the above properties and effects are not impaired. In this respect, in one embodiment, the refrigerant according to the present disclosure preferably comprises HFO-1132(E), R1234ze, and R1234yf in a total amount of 99.5 mass % or more, more preferably 99.75 mass, or more, even more preferably 99.9 mass % or more, still more preferably 99.999 mass % or more, and most preferably 99.9999 masse or more, based on the entire refrigerant. The refrigerant according to the present disclosure may essentially consist of HFO-1132(E), R1234ze, and R1234yf. In this case, the refrigerant according to the present disclosure may consist of HFO-1132(E), R1234ze, and R1234yf, as well as unavoidable impurities. The refrigerant according to the present disclosure may consist of HFO-1132(E), R1234ze, and R1234yf.

Additional refrigerants are not limited and can be widely selected. The mixed refrigerant may contain one additional refrigerant, or two or more additional refrigerants. Examples of the additional refrigerants include acetylene, HFO-1132a, HFO-1141, HFO-1123, HFC-143a, HFC-134a, Z-HFO-1132, HFO-1243zf, HFC-245cb, HCFC-1122, HCFC-124, CFC-1113, HFC-152a, HFC-161, and 3,3,3-trifluoropropyne. The total amount of the additional refrigerants is preferably 0.5 mass % or less, more preferably 0.25 mass % or less, still more preferably 0.1 mass % or less, and most preferably 0.01 mass % or less, based on the entire refrigerant.

2. Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 1 masse or less, and more preferably 0.1 masse or less.

2.1. Water

The refrigerant composition according to the present disclosure may contain a small amount of water. The water content of the refrigerant composition is preferably 0.1 masse or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

2.2. Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

The following compounds are preferred as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The refrigerant composition according to the present disclosure may comprise one or more tracers at a total concentration of about 10 parts per million by weight (ppm) or more based on the entire refrigerant composition. The refrigerant composition according to the present disclosure may comprise one or more tracers at a total concentration of about 1000 ppm or less, based on the entire refrigerant composition. The refrigerant composition according to the present disclosure preferably comprises one or more tracers at a total concentration of about 30 ppm or more, and more preferably about 50 ppm or more, based on the entire refrigerant composition. The refrigerant composition according to the present disclosure preferably comprises one or more tracers at a total concentration of about 500 ppm or less, and more preferably about 300 ppm or less, based on the entire refrigerant composition.

2.3. Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

2.4. Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is preferably 0.01 mass % or more, and more preferably 0.05 mass % or more, based on the entire refrigerant. The content of the stabilizer is preferably 5 mass % or less, and more preferably 2 mass or less, based on the entire refrigerant.

2.5. Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is preferably 0.01 mass % or more, and more preferably 0.05 mass % or more, based on the entire refrigerant. The content of the polymerization inhibitor is preferably 5 mass % or less, and more preferably 2 mass or less, based on the entire refrigerant.

3. Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 mass % or more of refrigeration oil. The refrigeration oil-containing working fluid generally comprises 50 mass % or less of refrigeration oil.

3.1. Refrigeration Oil

The composition according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 cSt or more at 40° C. is preferable from the standpoint of lubrication. Further, a refrigeration oil with a kinematic viscosity of 400 cSt or less at 40° C. is preferable from the standpoint of lubrication.

The refrigeration oil-containing working fluid according to the present disclosure may further optionally contain at least one additive. Examples of additives include compatibilizing agents described below.

3.2. Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure comprises the step of circulating the refrigerant according to the present disclosure in a refrigerating machine.

The embodiments are described above; however, it will be understood that various changes in forms and details can be made without departing from the spirit and scope of the claims.

Item 1.

A composition comprising a refrigerant, the refrigerant comprising trans-1,2-difluoroethylene (HFO-1132(E)), 1,3,3,3-tetrafluoropropene (R1234ze), and 2,3,3,3-tetrafluoro-1-propene (R1234yf).

Item 2.

The composition according to Item 1, wherein in the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BF, FE, and EA that connect the following four points:

point A (72.0, 27.0, 1.0),
point B (72.0, 1.0, 27.0),
point F (17.0, 1.0, 82.0), and
point E (34.1, 64.9, 1.0),
or on the line segments,
line segments AB, BF, and EA are straight lines, and
points on line segment FE are represented by (x, $-0.0556x^2+6.5772x-94.748$, $0.0556x^2-7.5772x+194.748$).

Item 3.

The composition according to Item 1, wherein in the refrigerant, when the mass' of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments CD, DF, FE, and EC that connect the following four points:

point C (38.7, 60.3, 1.0),
point D (52.4, 1.0, 46.6),
point F (17.0, 1.0, 82.0), and
point E (34.1, 64.9, 1.0),
or on the line segments,
line segments DF and EC are straight lines,
points on line segment CD are represented by (x, $-0.0455x^2-0.1834x+135.54$, $0.0455x^2-0.8166x-35.54$), and points on line segment FE are represented by (x, $-0.0556x^2+6.5772x-94.748$, $0.0556x^2-7.5772x+194.748$).

Item 4.

The composition according to Item 1, wherein in the refrigerant, when the masse of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BH, HG, and GA that connect the following four points:

point A (72.0, 27.0, 1.0),
point B (72.0, 1.0, 27.0),
point H (2.1, 1.0, 96.9), and
point G (14.4, 84.6, 1.0),
or on the line segments,
line segments AB, BH, and GA are straight lines, and
points on line segment HG are represented by (x, $-0.1974x^2+10.054x-19.242$, $0.1974x^2-11.054x+119.242$).

Item 5.

The composition according to Item 1, wherein in the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BJ, JI, and IA that connect the following four points:

point A (72.0, 27.0, 1.0),
point B (72.0, 1.0, 27.0),
point J (12.3, 1.0, 86.7), and
point I (22.6, 76.4, 1.0),
or on the line segments,
line segments AB, BJ, and IA are straight lines, and
points on line segment JI are represented by (x, $-0.1609x^2+12.934x-133.76$, $0.1609x^2-13.934x+233.76$).

Item 6.

The composition according to Item 1, wherein in the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BH', H'G', and G'A that connect the following four points:
- point A (72.0, 27.0, 1.0),
- point B (72.0, 1.0, 27.0),
- point H' (31.3, 1.0, 67.7), and
- point G' (44.1, 54.9, 1.0),
- or on the line segments,
  - line segments AB, BH', and G'A are straight lines, and
  - points on line segment H'G' are represented by (x, $-0.08728x^2+10.791x-251.26$, $0.08728x^2-11.791x+351.26$).

Item 7.

The composition according to Item 1, wherein in the refrigerant, when the mass' of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments CD, DH, HG, and GC that connect the following four points:
- point C (38.7, 60.3, 1.0),
- point D (52.4, 1.0, 46.6),
- point H (2.1, 1.0, 96.9), and
- point G (14.4, 84.6, 1.0),
- or on the line segments,
  - line segments DH and GC are straight lines,
  - points on line segment CD are represented by (x, $-0.0455x^2-0.1834x+135.54$, $0.0455x^2-0.8166x-35.54$), and
  - points on line segment HG are represented by (x, $-0.1974x^2+10.054x-19.242$, $0.1974x^2-11.054x+119.242$).

Item 8.

The composition according to Item 1, wherein in the refrigerant, when the masse of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments CD, DJ, JI, and IC that connect the following four points:
- point C (38.7, 60.3, 1.0),
- point D (52.4, 1.0, 46.6),
- point J (12.3, 1.0, 86.7), and
- point I (22.6, 76.4, 1.0),
- or on the line segments,
  - line segments DJ and IC are straight lines,
  - points on line segment CD are represented by (x, $-0.0455x^2-0.1834x+135.54$, $0.0455x^2-0.8166x-35.54$), and
  - points on line segment JI are represented by (x, $-0.1609x^2+12.934x-133.76$, $0.1609x^2-13.934x+233.76$).

Item 9.

The composition according to Item 1, wherein in the refrigerant, when the masse of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments PD, DH', and H'P that connect the following three points:
- point P (41.95, 47.8, 10.25),
- point D (52.4, 1.0, 46.6), and
- point H' (31.3, 1.0, 67.7),
- or on the line segments,
  - line segment DH' is a straight line,
  - points on line segment PD are represented by (x, $-0.0455x^2-0.1834x+135.54$, $0.0455x^2-0.8166x-35.54$), and
  - points on line segment H'P are represented by (x, $-0.08728x^2+10.791x-251.26$, $0.08728x^2-11.791x+351.26$).

Item 10.

The composition according to any one of Items 1 to 9, further comprising a refrigeration oil.

Item 11.

The composition according to any one of Items 1 to 10, for use as an alternative refrigerant for R404A.

Item 12.

A refrigerating machine comprising the composition according to any one of Items 1 to 10 as a working fluid.

Item 13.

A method for operating a refrigerating machine, comprising circulating the composition according to any one of Items 1 to 10 as a working fluid in a refrigerating machine.

Item 14.

Use of the composition according to any one of Items 1 to 10 as an alternative refrigerant for R410A.

EXAMPLES

The present disclosure is described in more detail below with reference to Examples. However, the present disclosure is not limited to the Examples.

Mixed refrigerants were prepared by mixing HFO-1132 (E), R1234ze, and R1234yf at mass % shown in Table 1 based on their sum.

The GWP of R410A (R32=50%/R125=50%) and the above mixed refrigerants was evaluated based on the values stated in the Intergovernmental Panel on Climate Change (IPCC), fourth report. The GWP of HFO-1132(E) was assumed to be 1. The refrigerating capacity of R410A and the above mixed refrigerants was determined by performing theoretical refrigeration cycle calculations for mixed refrigerants by using the Reference Fluid Thermodynamic and Transport Properties Database (Refprop 9.0) of the National Institute of Science and Technology (NIST) under the following conditions.

For each of these mixed refrigerants, the COP ratio and refrigerating capacity ratio relative to those of R410A were determined. The calculation conditions were as follows:
- Evaporating temperature: −50° C. for Table 1 and Table 5, and −10° C. for Table 2 and Table 6
- Condensation temperature: 45° C.
- Superheating temperature: 5 K
- Subcooling temperature: 5 K
- Compressor efficiency: 70%

Table 1 shows these values together with the GWP of each mixed refrigerant. The COP and refrigerating capacity are ratios relative to R410A or R134a.

The coefficient of performance (COP) was determined by the following formula.

$$COP = (\text{refrigerating capacity or heating capacity}) / \text{power consumption}$$

A burning velocity test was performed using the apparatus shown in FIG. 1 in the following manner. First, the mixed refrigerants were purified to 99.5% or more, and were deaerated by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The propagation of the flame was visualized by schlieren photography. A cylindrical container (inner diameter: 155 mm, length: 198 mm) equipped with two light-transmissive acrylic windows was used as the sample cell, and a xenon lamp was used as the light source. Schlieren images of the flame were recorded by a high-speed digital video camera at a frame rate of 600 fps and stored on a PC.

The burning velocity (Su (cm/s)) is expressed by the volume of unburned gas consumed by the flame surface of a unit area per unit time and is calculated by using the following formula.

$$Su = Sb * \rho u / \rho b$$

Sb: flame propagation rate (cm/s)
$\rho u$: adiabatic flame temperature (unburned)
$\rho b$: adiabatic flame temperature (burned)

Sb was determined from the schlieren video images. $\rho u$ was calculated from a measurement temperature. $\rho b$ was calculated from the combustion heat and isobaric specific heat of combustion gas.

TABLE 1

| Item | | Com. Ex. 1 | Ex. 1 A | Ex. 2 B | Ex. 3 C | Ex. 4 | Ex. 5 D | Ex. 6 E | Ex. 7 | Ex. 8 F |
|---|---|---|---|---|---|---|---|---|---|---|
| HFO-1132E | mass % | R404A | 72.0 | 72.0 | 38.7 | 45.8 | 52.4 | 34.1 | 25.6 | 17.0 |
| R1234ze | mass % | | 27.0 | 1.0 | 60.3 | 31.7 | 1.0 | 64.9 | 37.2 | 1.0 |
| R1234yf | mass % | | 1.0 | 27.0 | 1.0 | 22.5 | 46.6 | 1.0 | 37.2 | 82.0 |
| GWP | — | 3922 | 2.38 | 1.86 | 4.045 | 3.26 | 2.448 | 4.275 | 3.976 | 3.51 |
| COPc | % (relative to R404A) | 100.0 | 108.1 | 106.8 | 111 | 108.4 | 106.3 | 110.9 | 108.7 | 106.2 |
| Refrigerating capacity | % (relative to R404A) | 100.0 | 120.6 | 134.9 | 75.8 | 92.9 | 112.9 | 70.0 | 70.0 | 70.1 |
| Discharge pressure | Mpa | 1.822 | 2.018 | 2.145 | 1.489 | 1.697 | 1.913 | 1.412 | 1.396 | 1.368 |
| Evaporation pressure | Mpa | 0.082 | 0.084 | 0.100 | 0.049 | 0.064 | 0.083 | 0.045 | 0.047 | 0.051 |
| Compression ratio | — | 22.2 | 24.1 | 21.5 | 30.5 | 26.6 | 22.9 | 31.7 | 29.6 | 27.0 |
| Boiling point | ° C. | −46.2 | −50.3 | −51.2 | −44.3 | −47.3 | −49.3 | −43.8 | −43.1 | −42.1 |

| | Item | Unit | Ex. 1 A | Ex. 2 B |
|---|---|---|---|---|
| WCF | HFO-1132 (E) | mass % | 72.0 | 72.0 |
| | R1234ze | mass % | 27.0 | 1.0 |
| | R1234yf | mass % | 1.0 | 27.0 |
| | Burning velocity (WCF) | cm/s | 10 | 10 |

| | Item | Unit | Ex. 3 C | Ex. 4 Midpoint | Ex. 5 D |
|---|---|---|---|---|---|
| WCF | HFO-1132 (E) | mass % | 38.7 | 45.8 | 52.4 |
| | R1234ze | mass % | 60.3 | 31.7 | 1.0 |
| | R1234yf | mass % | 1.0 | 22.5 | 46.6 |
| | Leakage conditions for achieving WCFF | | Storage and transport at −40° C. and 0% release, gas phase side | Storage and transport at −40° C. and 0% release, gas phase side | Storage and transport at −40° C. and 0% release, gas phase side |
| WCFF | HFO-1132 (E) | mass % | 72.0 | 72.0 | 72.0 |
| | R1234ze | mass % | 27.3 | 12.7 | 0.4 |
| | R1234yf | mass % | 0.7 | 15.3 | 27.6 |
| | Burning velocity (WCF) | cm/s | 8 or less | 8 or less | 8 or less |
| | Burning velocity (WCFF) | cm/s | 10 | 10 | 10 |

TABLE 2

| Item | | Com. Ex. 2 | Ex. 9 G | Ex. 10 | Ex. 11 H | Ex. 12 G' | Ex. 13 | Ex. 14 H' | Ex. 15 I | Ex. 16 | Ex. 17 J |
|---|---|---|---|---|---|---|---|---|---|---|---|
| HFO-11328 | mass % | R134a | 14.4 | 9.1 | 2.1 | 44.1 | 38.9 | 31.3 | 2.26 | 17.4 | 12.3 |
| R1234ze | mass % | | 84.6 | 55.9 | 1.0 | 54.9 | 28.1 | 1.0 | 76.4 | 42.6 | 1.0 |
| R1234yf | mass % | | 1.0 | 35.0 | 96.9 | 1.0 | 35.0 | 67.7 | 1.0 | 40.0 | 86.7 |
| GWP | — | 1430 | 5.26 | 4.845 | 3.957 | 3.775 | 3.455 | 3.081 | 4.85 | 4.33 | 3.651 |
| COPc | % (relative to R134a) | 100.0 | 98.0 | 97 | 95.4 | 94.7 | 93.6 | 92.6 | 97.3 | 95.8 | 94.3 |
| Refrigerating capacity | % (relative to R134a) | 100.0 | 100.0 | 99.9 | 100.0 | 150.1 | 149.9 | 150.0 | 114.5 | 116.9 | 118.8 |
| Discharge pressure | Mpa | 1.160 | 1.211 | 1.211 | 1.207 | 1.784 | 1.799 | 1.814 | 1.377 | 1.414 | 1.445 |
| Evaporation pressure | Mpa | 0.201 | 0.203 | 0.212 | 0.230 | 0.332 | 0.346 | 0.359 | 0.237 | 0.255 | 0.275 |
| Compression ratio | — | 5.8 | 6.0 | 5.7 | 5.2 | 5.4 | 5.2 | 5.0 | 5.8 | 5.5 | 5.3 |
| Boiling point | ° C. | −26.1 | −35.9 | −34.6 | −32.1 | −46.1 | −46.0 | −46.1 | −40.0 | −40.0 | −40.0 |

These results indicate that when the refrigerant according to the present disclosure satisfies the following requirements, the refrigerant according to the present disclosure ensures a WCF lower flammability and has a refrigerating capacity ratio of 70% or more relative to that of R404A.

Requirements

In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 masse are within the range of a figure surrounded by line segments AB, BF, FE, and EA that connect the following four points:

point A (72.0, 27.0, 1.0),
point B (72.0, 1.0, 27.0),
point F (17.0, 1.0, 82.0), and
point E (34.1, 64.9, 1.0),
or on the line segments,
line segments AB, BF and EA are straight lines, and
points on line segment FE are represented by (x, $-0.0556x^2+6.5772x-94.748$, $0.0556x^2-7.5772x+194.748$).

These results indicate that when the refrigerant according to the present disclosure satisfies the following requirements, the refrigerant according to the present disclosure ensures a WCFF lower flammability and has a refrigerating capacity ratio of 70% or more relative to that of R404A.

Requirements

In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments CD, DF, FE, and EC that connect the following four points:

point C (38.7, 60.3, 1.0),
point D (52.4, 1.0, 46.6),
point F (17.0, 1.0, 82.0), and
point E (34.1, 64.9, 1.0),
or on the line segments,
line segments DF and EC are straight lines,
points on line segment CD are represented by (x, $-0.0455x^2-0.1834x+135.54$, $0.0455x^2-0.8166x-35.54$), and
points on line segment FE are represented by (x, $-0.0556x^2+6.5772x-94.748$, $0.0556x^2-7.5772x+194.748$).

These results indicate that when the refrigerant according to the present disclosure satisfies the following requirements, the refrigerant according to the present disclosure ensures a WCF lower flammability and has a refrigerating capacity ratio of 100, or more relative to that of R134a.

Requirements

In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 masse are within the range of a figure surrounded by line segments AB, BH, HG, and GA that connect the following four points:

point A (72.0, 27.0, 1.0),
point B (72.0, 1.0, 27.0),
point H (2.1, 1.0, 96.9), and
point G (14.4, 84.6, 1.0),
or on the line segments,
line segments AB, BH, and GA are straight lines, and
points on line segment HG are represented by (x, $-0.1974x^2+10.054x-19.242$, $0.1974x^2-11.054x+119.242$).

These results indicate that when the refrigerant according to the present disclosure satisfies the following requirements, the refrigerant according to the present disclosure ensures a WCF lower flammability and has a boiling point of −40° C. or less.

Requirements

In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BJ, JI, and IA that connect the following four points:

point A (72.0, 27.0, 1.0),
point B (72.0, 1.0, 27.0),
point J (12.3, 1.0, 86.7), and
point I (22.6, 76.4, 1.0),
or on the line segments,
line segments AB, BJ, and IA are straight lines, and
points on line segment JI are represented by (x, $-0.1609x^2+12.934x-133.76$, $0.1609x^2-13.934x+233.76$).

These results indicate that when the refrigerant according to the present disclosure satisfies the following requirements, the refrigerant according to the present disclosure ensures a WCF lower flammability and has a refrigerating capacity ratio of 150% or more relative to that of R134a.

Requirements

In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BH', H'G', and G'A that connect the following four points:
point A (72.0, 27.0, 1.0),
point B (72.0, 1.0, 27.0),
point H' (31.3, 1.0, 67.7), and
point G' (44.1, 54.9, 1.0),
or on the line segments,
line segments AB, BH', and G'A are straight lines, and
points on line segment H'G' are represented by (x, $-0.08728x^2+10.791x-251.26$, $0.08728x^2-11.791x+351.26$).

These results indicate that when the refrigerant according to the present disclosure satisfies the following requirements, the refrigerant according to the present disclosure ensures a WCFF lower flammability and has a refrigerating capacity ratio of 100% or more relative to that of R134a.
Requirements
In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 masse are within the range of a figure surrounded by line segments CD, DH, HG, and GC that connect the following four points:
point C (38.7, 60.3, 1.0),
point D (52.4, 1.0, 46.6),
point H (2.1, 1.0, 96.9), and
point G (14.4, 84.6, 1.0),
or on the line segments,
line segments DH and GC are straight lines,
points on line segment CD are represented by (x, $-0.0455x^2-0.1834x+135.54$, $0.0455x^2-0.8166x-35.54$), and
points on line segment HG are represented by (x, $-0.1974x^2+10.054x-19.242$, $0.1974x^2-11.054x+119.242$).

These results indicate that when the refrigerant according to the present disclosure satisfies the following requirements, the refrigerant according to the present disclosure ensures a WCFF lower flammability and has a boiling point of −40° C. or less.
Requirements
In the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 masse are within the range of a figure surrounded by line segments CD, DJ, JI, and IC that connect the following four points:
point C (38.7, 60.3, 1.0),
point D (52.4, 1.0, 46.6),
point J (12.3, 1.0, 86.7), and
point I (22.6, 76.4, 1.0),
or on the line segments,
line segments DJ and IC are straight lines,
points on line segment CD are represented by (x, $-0.0455x^2-0.1834x+135.54$, $0.0455x^2-0.8166x-35.54$), and
points on line segment JI are represented by (x, $-0.1609x^2+12.934x-133.76$, $0.1609x^2-13.934x+233.76$).

These results indicate that when the refrigerant according to the present disclosure satisfies the following requirements, the refrigerant according to the present disclosure ensures a WCFF lower flammability and has a refrigerating capacity ratio of 150% s or more relative to that of R134a.
Requirements
In the refrigerant, when the mass of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments PD, DH', and H'P that connect the following three points:
point P (41.95, 47.8, 10.25),
point D (52.4, 1.0, 46.6), and
point H' (31.3, 1.0, 67.7),
or on the straight lines,
line segment DH' is a straight line,
points on line segment PD are represented by (x, $-0.0455x^2-0.1834x+135.54$, $0.0455x^2+-0.8166x-35.54$), and
points on line segment H'P are represented by (x, $-0.08728x^2+10.791x-251.26$, $0.08728x^2-11.791x+351.26$).

Approximate expressions indicating the coordinates of a point on each line segment were obtained by determining approximate expressions for the curves connecting three points by the least-squares method, as shown in Tables 3 and 4.

TABLE 3

| Item | | C | Midpoint | D | E | Midpoint | F |
|---|---|---|---|---|---|---|---|
| HFO-1132E | mass % | 38.7 | 45.8 | 52.4 | 34.1 | 25.6 | 17.0 |
| R1234ze | mass % | 60.3 | 31.7 | 1.0 | 64.9 | 37.2 | 1.0 |
| R1234yf | mass % | 1.0 | 22.5 | 46.6 | 1.0 | 37.2 | 82.0 |
| x = HFO-1132E | | | x | | | x | |
| y = R1234ze | | | $-0.0455x^2 - 0.1834x + 135.54$ | | | $-0.0556x^2 + 6.5772x - 94.748$ | |
| z = R1234yf | | | $0.0455x^2 - 0.8166x - 35.54$ | | | $0.0556x^2 - 7.5772x + 194.748$ | |

TABLE 4

| Item | | G | Midpoint | H | G' | Midpoint | H' | I | Midpoint | J |
|---|---|---|---|---|---|---|---|---|---|---|
| HFO-1132E | mass % | 14.4 | 9.1 | 2.1 | 44.1 | 36.9 | 31.3 | 22.6 | 17.4 | 12.3 |
| R1234ze | mass % | 84.6 | 55.9 | 1.0 | 54.9 | 28.1 | 1.0 | 76.4 | 42.6 | 1.0 |
| R1234yf | mass % | 1.0 | 35.0 | 96.9 | 1.0 | 35.0 | 67.7 | 1.0 | 40.0 | 86.7 |
| x = HFO-1132E | | | x | | | x | | | x | |
| y = R1234ze Approximate expression | | | $0.1974x^2 + 10.054x - 19.242$ | | | $-0.08728x^2 + 10.791x - 251.26$ | | | $-0.1609x^2 + 12.934x - 133.76$ | |
| z = R1234yf Approximate expression | | | $0.1974x^2 - 11.054x + 119.242$ | | | $0.08728x^2 - 11.791x + 351.26$ | | | $0.1609x^2 - 13.934x + 233.76$ | |

Table 5 also shows the results of a comparison of the performance between the mixed refrigerants shown in Table 5 and R404A.

TABLE 5

| Item | | Com. Ex. 1 | Com. Ex. 3 | Com. Ex. 4 | Com. Ex. 5 | Com. Ex. 6 | Com. Ex. 7 | Com. Ex. 8 | Ex. 18 |
|---|---|---|---|---|---|---|---|---|---|
| HFO-1132E | mass % | R404A | 20.0 | 20.0 | 20.0 | 20.0 | 20.0 | 20.0 | 20.0 |
| R1234ze | mass % | | 70.0 | 60.0 | 50.0 | 40.0 | 30.0 | 20.0 | 10.0 |
| R1234yf | mass % | | 10.0 | 20.0 | 30.0 | 40.0 | 50.0 | 60.0 | 70.0 |
| GWP | — | 3922 | 4.8 | 4.6 | 4.4 | 4.2 | 4 | 3.8 | 3.6 |
| COPc | % (relative to R404A) | 100.0 | 111.1 | 110.3 | 110 | 109 | 108.1 | 107.5 | 106.8 |
| Refrigerating capacity | % (relative to R404A) | 100.0 | 55.7 | 58.2 | 60.8 | 63.4 | 66.1 | 68.8 | 71.4 |
| Discharge pressure | Mpa | 1.822 | 1.200 | 1.233 | 1.267 | 1.300 | 1.333 | 1.364 | 1.395 |
| Evaporation pressure | Mpa | 0.082 | 0.035 | 0.037 | 0.040 | 0.042 | 0.045 | 0.048 | 0.051 |
| Compression ratio | — | 22.2 | 34.4 | 33.3 | 31.9 | 30.7 | 29.5 | 28.5 | 27.5 |
| Boiling point | °C. | −46.2 | −39.5 | −40.0 | −40.6 | −41.2 | −41.7 | −42.2 | −42.7 |

| Item | | Ex. 19 | Ex. 20 | Ex. 21 | Ex. 22 | Ex. 23 | Ex. 24 | Ex. 25 | Ex. 26 |
|---|---|---|---|---|---|---|---|---|---|
| HFO-1132E | mass % | 30.0 | 30.0 | 30.0 | 30.0 | 30.0 | 30.0 | 40.0 | 40.0 |
| R1234ze | mass % | 60.0 | 50.0 | 40.0 | 30.0 | 20.0 | 10.0 | 50.0 | 40.0 |
| R1234yf | mass % | 10.0 | 20.0 | 30.0 | 40.0 | 50.0 | 60.0 | 10.0 | 20.0 |
| GWP | — | 4.3 | 4.3 | 3.9 | 3.7 | 3.5 | 3.3 | 3.8 | 3.6 |
| COPc | % (relative to R404A) | 110.5 | 109.7 | 108.9 | 108.2 | 107.5 | 106.8 | 109.8 | 109.0 |
| Refrigerating capacity | % (relative to R404A) | 67.6 | 70.6 | 73.7 | 76.8 | 80.0 | 83.1 | 80.5 | 83.9 |
| Discharge pressure | Mpa | 1.376 | 1.414 | 1.451 | 1.487 | 1.523 | 1.558 | 1.547 | 1.588 |
| Evaporation pressure | Mpa | 0.043 | 0.046 | 0.049 | 0.053 | 0.056 | 0.059 | 0.053 | 0.057 |
| Compression ratio | — | 31.7 | 30.5 | 29.4 | 28.3 | 27.2 | 26.2 | 29.2 | 28.1 |
| Boiling point | °C. | −43.1 | −43.6 | −44.0 | −44.5 | −45.0 | −45.4 | −45.6 | −46.0 |

| Item | | Ex. 27 | Ex. 28 | Ex. 29 | Ex. 30 | Ex. 31 | Ex. 32 | Ex. 33 | Ex. 34 |
|---|---|---|---|---|---|---|---|---|---|
| HFO-1132E | mass % | 40.0 | 40.0 | 40.0 | 50.0 | 50.0 | 50.0 | 60.0 | 60.0 |
| R1234ze | mass % | 30.0 | 20.0 | 10.0 | 40.0 | 30.0 | 20.0 | 10.0 | 30.0 |
| R1234yf | mass % | 30.0 | 40.0 | 50.0 | 10.0 | 20.0 | 30.0 | 40.0 | 10.0 |
| GWP | — | 3.4 | 3.2 | 3 | 3.3 | 3.1 | 2.9 | 2.7 | 2.8 |
| COPc | % (relative to R404A) | 108.3 | 107.5 | 106.9 | 109.0 | 108.2 | 107.5 | 106.9 | 108.2 |
| Refrigerating capacity | % (relative to R404A) | 87.5 | 91.2 | 94.8 | 93.8 | 97.8 | 102.0 | 106.2 | 107.7 |
| Discharge pressure | Mpa | 1.628 | 1.668 | 1.707 | 1.713 | 1.757 | 1.801 | 1.843 | 1.875 |
| Evaporation pressure | Mpa | 0.060 | 0.064 | 0.068 | 0.063 | 0.068 | 0.072 | 0.077 | 0.074 |
| Compression ratio | — | 27.0 | 26.0 | 25.0 | 27.0 | 26.0 | 25.0 | 24.0 | 25.2 |
| Boiling point | °C. | −46.4 | −46.9 | −47.3 | −47.5 | −47.9 | −48.3 | −48.7 | −49.1 |

| Item | | Ex. 35 | Ex. 36 | Ex. 37 | Ex. 38 | Com. Ex. 9 |
|---|---|---|---|---|---|---|
| HFO-1132E | mass % | 60.0 | 60.0 | 70.0 | 70.0 | 80.0 |
| R1234ze | mass % | 20.0 | 10.0 | 20.0 | 10.0 | 10.0 |
| R1234yf | mass % | 20.0 | 30.0 | 10.0 | 20.0 | 10.0 |
| GWP | — | 2.6 | 2.4 | 2.3 | 2.1 | 1.8 |
| COPc | % (relative to R404A) | 107.6 | 107.0 | 107.7 | 107.2 | 107.4 |
| Refrigerating capacity | % (relative to R404A) | 112.4 | 117.3 | 122.4 | 127.8 | 137.8 |
| Discharge pressure | Mpa | 1.922 | 1.967 | 2.032 | 2.080 | 2.182 |
| Evaporation pressure | Mpa | 0.080 | 0.085 | 0.086 | 0.092 | 0.099 |
| Compression ratio | — | 24.2 | 23.2 | 23.5 | 22.5 | 22.0 |
| Boiling point | °C. | −49.4 | −49.8 | −50.4 | −50.7 | −51.5 |

Table 6 also shows the results of a comparison of the performance between the mixed refrigerants shown in Table 6 and R134a.

TABLE 6

| Item | | Com. Ex. 2 | Com. Ex. 10 | Com. Ex. 11 | Ex. 39 | Ex. 40 | Ex. 41 | Ex. 42 | Ex. 43 |
|---|---|---|---|---|---|---|---|---|---|
| HFO-1132E | mass % | R134a | 10.0 | 10.0 | 10.0 | 10.0 | 10.0 | 10.0 | 10.0 |
| R1234ze | mass % | | 80.0 | 70.0 | 60.0 | 50.0 | 40.0 | 30.0 | 20.0 |
| R1234yf | mass % | | 10.0 | 20.0 | 30.0 | 40.0 | 50.0 | 60.0 | 70.0 |
| GWP | — | 1430 | 5.3 | 5.1 | 4.9 | 4.7 | 4.5 | 4.3 | 4.1 |
| COPc | % (relative to R134a) | 100.0 | 98.0 | 97.6 | 97 | 97 | 96.2 | 95.7 | 95.3 |
| Refrigerating capacity | % (relative to R134a) | 100.0 | 94.7 | 97.5 | 100.3 | 103.0 | 105.6 | 108.1 | 110.5 |
| Discharge pressure | Mpa | 1.160 | 1.148 | 1.182 | 1.216 | 1.249 | 1.281 | 1.312 | 1.342 |
| Evaporation pressure | Mpa | 0.201 | 0.193 | 0.202 | 0.211 | 0.220 | 0.230 | 0.239 | 0.248 |
| Compression ratio | — | 5.8 | 5.9 | 5.9 | 5.8 | 5.7 | 5.6 | 5.5 | 5.4 |
| Boiling point | °C. | −26.1 | −33.4 | −34.2 | −35.0 | −35.7 | −36.4 | −37.0 | −37.6 |

| Item | | Ex. 44 | Ex. 45 | Ex. 46 | Ex. 47 | Ex. 48 | Ex. 49 | Ex. 50 | Ex. 51 |
|---|---|---|---|---|---|---|---|---|---|
| HFO-1132E | mass % | 10.0 | 20.0 | 20.0 | 20.0 | 20.0 | 20.0 | 20.0 | 20.0 |
| R1234ze | mass % | 10.0 | 70.0 | 60.0 | 50.0 | 40.0 | 30.0 | 20.0 | 10.0 |
| R1234yf | mass % | 80.0 | 10.0 | 20.0 | 30.0 | 40.0 | 50.0 | 60.0 | 70.0 |
| GWP | — | 3.9 | 4.8 | 4.8 | 4.4 | 4.2 | 4 | 3.8 | 3.6 |
| COPc | % (relative to R134a) | 94.9 | 97.1 | 96.5 | 96.0 | 95.5 | 95.0 | 94.5 | 94.0 |
| Refrigerating capacity | % (relative to R134a) | 112.8 | 112.8 | 115.8 | 118.8 | 121.7 | 124.6 | 127.3 | 129.9 |
| Discharge pressure | Mpa | 1.370 | 1.359 | 1.397 | 1.434 | 1.471 | 1.506 | 1.541 | 1.575 |
| Evaporation pressure | Mpa | 0.257 | 0.236 | 0.246 | 0.257 | 0.268 | 0.279 | 0.290 | 0.300 |
| Compression ratio | — | 5.3 | 5.8 | 5.7 | 5.6 | 5.5 | 5.4 | 5.3 | 5.2 |
| Boiling point | °C. | −38.2 | −39.6 | −40.0 | −40.6 | −41.2 | −41.7 | −42.2 | −42.7 |

| Item | | Ex. 52 | Ex. 53 | Ex. 54 | Ex. 55 | Ex. 56 | Ex. 57 | Ex. 58 | Ex. 59 |
|---|---|---|---|---|---|---|---|---|---|
| HFO-1132E | mass % | 30.0 | 30.0 | 30.0 | 30.0 | 30.0 | 30.0 | 40.0 | 40.0 |
| R1234ze | mass % | 60.0 | 50.0 | 40.0 | 30.0 | 20.0 | 10.0 | 50.0 | 40.0 |
| R1234yf | mass % | 10.0 | 20.0 | 30.0 | 40.0 | 50.0 | 60.0 | 10.0 | 20.0 |
| GWP | — | 4.3 | 4.3 | 3.9 | 3.7 | 3.5 | 3.3 | 3.8 | 3.6 |
| COPc | % (relative to R134a) | 96.0 | 95.4 | 94.8 | 94.3 | 93.7 | 93.2 | 94.7 | 94.1 |
| Refrigerating capacity | % (relative to R134a) | 130.2 | 133.4 | 136.6 | 139.7 | 142.7 | 145.6 | 146.7 | 150.1 |
| Discharge pressure | Mpa | 1.558 | 1.599 | 1.640 | 1.680 | 1.720 | 1.758 | 1.749 | 1.794 |
| Evaporation pressure | Mpa | 0.280 | 0.293 | 0.305 | 0.318 | 0.330 | 0.343 | 0.326 | 0.340 |
| Compression ratio | — | 5.6 | 5.5 | 5.4 | 5.3 | 5.2 | 5.1 | 5.4 | 5.3 |
| Boiling point | °C. | −43.1 | −43.6 | −44.0 | −44.5 | −45.0 | −45.4 | −45.6 | −46.0 |

| Item | | Ex. 60 | Ex. 61 | Ex. 62 | Ex. 63 | Ex. 64 | Ex. 65 | Ex. 66 | Ex. 67 |
|---|---|---|---|---|---|---|---|---|---|
| HFO-1132E | mass % | 40.0 | 40.0 | 40.0 | 50.0 | 50.0 | 50.0 | 50.0 | 60.0 |
| R1234ze | mass % | 30.0 | 20.0 | 10.0 | 40.0 | 30.0 | 20.0 | 10.0 | 30.0 |
| R1234yf | mass % | 30.0 | 40.0 | 50.0 | 10.0 | 20.0 | 30.0 | 40.0 | 10.0 |
| GWP | — | 3.4 | 3.2 | 3 | 3.3 | 3.1 | 2.9 | 2.7 | 2.8 |
| COPc | % (relative to R134a) | 93.5 | 92.9 | 92.3 | 93.3 | 92.7 | 92.2 | 91.6 | 92.2 |
| Refrigerating capacity | % (relative to R134a) | 153.5 | 156.8 | 159.9 | 162.6 | 166.2 | 169.8 | 173.3 | 178.1 |
| Discharge pressure | Mpa | 1.839 | 1.882 | 1.925 | 1.935 | 1.983 | 2.031 | 2.077 | 2.116 |
| Evaporation pressure | Mpa | 0.354 | 0.369 | 0.383 | 0.373 | 0.389 | 0.405 | 0.421 | 0.421 |
| Compression ratio | — | 5.2 | 5.1 | 5.0 | 5.2 | 5. | 5.0 | 4.9 | 5.0 |
| Boiling point | °C. | −46.4 | −46.9 | −47.3 | −47.5 | −47.9 | −48.3 | −48.7 | −49.1 |

| Item | | Ex. 68 | Ex. 69 | Ex. 70 | Ex. 71 | Com. Ex. 12 |
|---|---|---|---|---|---|---|
| HFO-1132E | mass % | 60.0 | 60.0 | 70.0 | 70.0 | 80.0 |
| R1234ze | mass % | 20.0 | 10.0 | 20.0 | 10.0 | 10.0 |
| R1234yf | mass % | 20.0 | 30.0 | 10.0 | 20.0 | 10.0 |
| GWP | — | 2.6 | 2.4 | 2.3 | 2.1 | 1.8 |
| COPc | % (relative to R134a) | 91.6 | 91.0 | 91.2 | 90.6 | 90.4 |
| Refrigerating capacity | % (relative to R134a) | 182.0 | 185.8 | 193.5 | 197.5 | 208.6 |
| Discharge pressure | Mpa | 2.166 | 2.216 | 2.289 | 2.342 | 2.456 |
| Evaporation pressure | Mpa | 0.438 | 0.456 | 0.469 | 0.489 | 0.518 |
| Compression ratio | — | 4.9 | 4.9 | 4.9 | 4.8 | 4.7 |
| Boiling point | °C. | 49.4 | 49.8 | −50.4 | −50.7 | −51.5 |

The invention claimed is:

1. A composition comprising a refrigerant, the refrigerant comprising trans-1,2-difluoroethylene (HFO-1132(E)), 1,3,3,3-tetrafluoropropene (R1234ze), and 2,3,3,3-tetrafluoro-1-propene (R1234yf), wherein in the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BF, FE, and EA that connect the following four points:
point A (72.0, 27.0, 1.0),
point B (72.0, 1.0, 27.0),
point F (17.0, 1.0, 82.0), and
point E (34.1, 64.9, 1.0),
or on the line segments, line segments AB, BF, and EA are straight lines, and
points on line segment FE are represented by (x, −0.0556x²+6.5772x−94.748, 0.0556x²−7.5772x+194.748).

2. The composition according to claim 1, further comprising a refrigeration oil.

3. The composition according to claim 1, for use as an alternative refrigerant for R404A.

4. A refrigerating machine comprising the composition according to claim 1 as a working fluid.

5. A method for operating a refrigerating machine, comprising circulating the composition according to claim 1 as a working fluid in a refrigerating machine.

6. A method for operating a refrigerating machine, comprising circulating the composition according to claim 1 in a refrigerator machine designed for R410A.

7. A composition comprising a refrigerant, the refrigerant comprising trans-1,2-difluoroethylene (HFO-1132(E)), 1,3,3,3-tetrafluoropropene (R1234ze), and 2,3,3,3-tetrafluoro-1-propene (R1234yf), wherein in the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments CD, DF, FE, and EC that connect the following four points:
point C (38.7, 60.3, 1.0),
point D (52.4, 1.0, 46.6),
point F (17.0, 1.0, 82.0), and
point E (34.1, 64.9, 1.0),
or on the line segments,
line segments DF and EC are straight lines,
points on line segment CD are represented by (x, −0.0455x²−0.1834x+135.54, 0.0455x²−0.8166x−35.54), and
points on line segment FE are represented by (x, −0.0556x²+6.5772x−94.748, 0.0556x²−7.5772x+194.748).

8. A composition comprising a refrigerant, the refrigerant comprising trans-1,2-difluoroethylene (HFO-1132(E)), 1,3,3,3-tetrafluoropropene (R1234ze), and 2,3,3,3-tetrafluoro-1-propene (R1234yf), wherein in the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BH, HG, and GA that connect the following four points:
point A (72.0, 27.0, 1.0),
point B (72.0, 1.0, 27.0),
point H (2.1, 1.0, 96.9), and
point G (14.4, 84.6, 1.0),
or on the line segments,
line segments AB, BH, and GA are straight lines, and
points on line segment HG are represented by (x, −0.1974x²+10.054x−19.242, 0.1974x²−11.054x+119.242).

9. A composition comprising a refrigerant, the refrigerant comprising trans-1,2-difluoroethylene (HFO-1132(E)), 1,3,3,3-tetrafluoropropene (R1234ze), and 2,3,3,3-tetrafluoro-1-propene (R1234yf), wherein in the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BJ, JI, and IA that connect the following four points:
point A (72.0, 27.0, 1.0),
point B (72.0, 1.0, 27.0),
point J (12.3, 1.0, 86.7), and
point I (22.6, 76.4, 1.0),
or on the line segments,
line segments AB, BJ, and IA are straight lines, and
points on line segment JI are represented by (x, −0.1609x²+12.934x−133.76, 0.1609x²−13.934x+233.76).

10. A composition comprising a refrigerant, the refrigerant comprising trans-1,2-difluoroethylene (HFO-1132(E)), 1,3,3,3-tetrafluoropropene (R1234ze), and 2,3,3,3-tetrafluoro-1-propene (R1234yf), wherein in the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments AB, BH', H'G', and G'A that connect the following four points:
point A (72.0, 27.0, 1.0),
point B (72.0, 1.0, 27.0),
point H' (31.3, 1.0, 67.7), and
point G' (44.1, 54.9, 1.0),
or on the line segments,
line segments AB, BH', and G'A are straight lines, and
points on line segment H'G' are represented by (x, −0.08728x²+10.791x−251.26, 0.08728x²−11.791x+351.26).

11. A composition comprising a refrigerant, the refrigerant comprising trans-1,2-difluoroethylene (HFO-1132(E)), 1,3,3,3-tetrafluoropropene (R1234ze), and 2,3,3,3-tetrafluoro-1-propene (R1234yf), wherein in the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments CD, DH, HG, and GC that connect the following four points:
point C (38.7, 60.3, 1.0),
point D (52.4, 1.0, 46.6),
point H (2.1, 1.0, 96.9), and
point G (14.4, 84.6, 1.0),
or on the line segments,
line segments DH and GC are straight lines,
points on line segment CD are represented by (x, −0.0455x²−0.1834x+135.54, 0.0455x²−0.8166x−35.54), and points on line segment HG are represented by (x, −0.1974x²+10.054x−19.242, 0.1974x²−11.054x+119.242).

12. A composition comprising a refrigerant, the refrigerant comprising trans-1,2-difluoroethylene (HFO-1132(E)), 1,3,3,3-tetrafluoropropene (R1234ze), and 2,3,3,3-tetrafluoro-1-propene (R1234yf), wherein in the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments CD, DJ, JI, and IC that connect the following four points:
point C (38.7, 60.3, 1.0),
point D (52.4, 1.0, 46.6),
point J (12.3, 1.0, 86.7), and
point I (22.6, 76.4, 1.0),
or on the line segments, line segments DJ and IC are straight lines,
points on line segment CD are represented by (x, $-0.0455x^2-0.1834x+135.54$, $0.0455x^2-0.8166x-35.54$), and
points on line segment JI are represented by (x, $-0.1609x^2+12.934x-133.76$, $0.1609x^2-13.934x+233.76$).

13. A composition comprising a refrigerant, the refrigerant comprising trans-1,2-difluoroethylene (HFO-1132(E)), 1,3,3,3-tetrafluoropropene (R1234ze), and 2,3,3,3-tetrafluoro-1-propene (R1234yf), wherein in the refrigerant, when the mass % of HFO-1132(E), R1234ze, and R1234yf based on their sum is respectively represented by x, y, and z, coordinates (x,y,z) in a ternary composition diagram in which the sum of HFO-1132(E), R1234ze, and R1234yf is 100 mass % are within the range of a figure surrounded by line segments PD, DH', and H'P that connect the following three points:
point P (41.95, 47.8, 10.25),
point D (52.4, 1.0, 46.6), and
point H' (31.3, 1.0, 67.7),
or on the line segments,
line segment DH' is a straight line,
points on line segment PD are represented by (x, $-0.0455x^2-0.1834x+135.54$, $0.0455x^2-0.8166x-35.54$), and
points on line segment H'P are represented by (x, $-0.08728x^2+10.791x-251.26$, $0.08728x^2-11.791x+351.26$).

\* \* \* \* \*